(12) United States Patent
Sosnovich et al.

(10) Patent No.: US 12,418,508 B2
(45) Date of Patent: Sep. 16, 2025

(54) INFERRING CLOUD NETWORK CONNECTIVITY AS A MINIMAL LIST OF FIREWALL RULES

(71) Applicant: INTERNATIONAL BUSINESS MACHINES CORPORATION, Armonk, NY (US)

(72) Inventors: Adi Sosnovich, Haifa (IL); Ziv Nevo, Yokneam Ilit (IL); Gil Eliezer Shurek, Haifa (IL); Shai Doron, Kibuz Meggido (IL); Karen Frida Yorav, Haifa (IL)

(73) Assignee: International Business Machines Corporation, Armonk, NY (US)

(*) Notice: Subject to any disclaimer, the term of this patent is extended or adjusted under 35 U.S.C. 154(b) by 769 days.

(21) Appl. No.: 17/643,009

(22) Filed: Dec. 7, 2021

(65) Prior Publication Data
US 2023/0179573 A1     Jun. 8, 2023

(51) Int. Cl.
*H04L 9/40* (2022.01)
*H04L 41/22* (2022.01)

(52) U.S. Cl.
CPC .......... *H04L 63/0263* (2013.01); *H04L 41/22* (2013.01); *H04L 63/0236* (2013.01); *H04L 63/102* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 10,511,630 B1* | 12/2019 | Weiss | H04L 63/20 |
| 10,547,521 B1 | 1/2020 | Roy | |
| 11,303,611 B1* | 4/2022 | Karyampudi | H04L 63/0263 |
| 2009/0178105 A1* | 7/2009 | Feng | H04L 63/20 |
| | | | 726/1 |
| 2016/0094401 A1* | 3/2016 | Anwar | H04L 43/0817 |
| | | | 709/223 |
| 2020/0177684 A1* | 6/2020 | Yu | H04L 45/02 |
| 2020/0257810 A1 | 8/2020 | Vrabec | |
| 2020/0382560 A1 | 12/2020 | Woolward | |
| 2022/0417219 A1* | 12/2022 | Sheriff | H04L 67/56 |
| 2023/0022134 A1* | 1/2023 | Talwar | G06F 9/45558 |
| 2023/0216888 A1* | 7/2023 | Alaeddini | H04L 63/08 |
| | | | 726/1 |

OTHER PUBLICATIONS

Cilium, "Cilium 1.7: Hubble UI, Cluster-wide Network Policies, eBPF-based Direct Server Return, TLS visibility, New eBPF Go Library, . . . , " Cllium, Feb. 19, 2020, 18 pgs.

(Continued)

*Primary Examiner* — Bassam A Noaman
(74) *Attorney, Agent, or Firm* — Tihon Poltavets

(57) ABSTRACT

A method, computer system, and a computer program product for determining a cluster connectivity is provided. The present invention may first include receiving as input a connectivity graph. The present invention may then include generating a minimal list of firewall rules from the received connectivity graph by iteratively merging firewall rules with commonality of connectivity attribute.

12 Claims, 6 Drawing Sheets

(56) References Cited

OTHER PUBLICATIONS

Cilium, "Network Policy Editor for Kubernetes," Cilium.com, [accessed Oct. 4, 2021], 1 pg., Retrieved from the Internet: <https://editor.cilium.lo/>.
Fenwick, "Tools for Understanding, Measuring, and Applying Network Policies Effectively in Kubernetes," GolangRepo.com, Aug. 16, 2021, 19 pages, Retrieved from the Internet <https://golangrepo.com/repo/mattfenwick- cyclonus>.
Github, "Tools for Understanding, Measuring, and Applying Network Policies Effectively in Kubernetes," Github.com, [accessed Oct. 1, 2021], 3 pgs., Retrieved from the Internet: <https://github.com/mattfenwick/cyclonus>.
Mell et al., "The NIST Definition of Cloud Computing", National Institute of Standards and Technology, Special Publication 800-145, Sep. 2011, pp. 1-7.
Stackrox, "Red Hat Acquires Kubernetes-Native Security Leader StackRox," [accessed Oct. 1, 2021], 9 pgs., Retrieved from the Internet: <https://www.stackrox.com/>.
Tufin, "Network Policy Viewer," Tufin, [accessed Oct. 1, 2021], 1 pg., Retrieved from the Internet: <https://orca.tufin.io/netpol>.

\* cited by examiner

300

| | | | |
|---|---|---|---|
| 1 | src: kube-system-new/calico-node-mgdlr | dest: kube-system-new/calico-node-mgdlr | allowed conns: All connections |
| 2 | src: kube-system-new/calico-node-mgdlr | dest: default/cognetive-agents-d54st | allowed conns: All connections |
| 3 | src: kube-system-new/calico-node-mgdlr | dest: default/cognetive-agents-js4qc | allowed conns: All connections |
| 4 | src: default/cognetive-agents-d54st | dest: default/cognetive-agents-d54st | allowed conns: All connections |
| 5 | src: default/cognetive-agents-d54st | dest: default/cognetive-agents-js4qc | allowed conns: All connections |
| 6 | src: kube-system-new/heapster-7df8cb8c66-zxkk2 | dest: default/cognetive-agents-d54st | allowed conns: All connections |
| 7 | src: kube-system-new/heapster-7df8cb8c66-zxkk2 | dest: kube-system-new/heapster-7df8cb8c66-zxkk2 | allowed conns: All connections |
| 8 | src: kube-system-new/heapster-7df8cb8c66-zxkk2 | dest: default/cognetive-agents-js4qc | allowed conns: All connections |
| 9 | src: default/cognetive-agents-js4qc | dest: default/cognetive-agents-d54st | allowed conns: All connections |
| 10 | src: default/cognetive-agents-js4qc | dest: default/cognetive-agents-js4qc | allowed conns: All connections |
| 11 | src: kube-system-new/calico-node-mgdlr | dest: 0.0.0.0-255.255.255.255 | allowed conns: All connections |
| 12 | src: default/cognetive-agents-d54st | dest: 0.0.0.0-255.255.255.255 | allowed conns: All connections |
| 13 | src: kube-system-new/heapster-7df8cb8c66-zxkk2 | dest: 0.0.0.0-255.255.255.255 | allowed conns: All connections |
| 14 | src: default/cognetive-agents-js4qc | dest: 0.0.0.0-255.255.255.255 | allowed conns: All connections |
| 15 | src: 0.0.0.0-255.255.255.255 | dest: default/cognetive-agents-d54st | allowed conns: All connections |
| 16 | src: 0.0.0.0-255.255.255.255 | dest: default/cognetive-agents-js4qc | allowed conns: All connections |
| 17 | src: default/cognetive-agents-d54st | dest: kube-system-new/calico-node-mgdlr | allowed conns: Protocol: TCP 85-90 |
| 18 | src: default/cognetive-agents-d54st | dest: kube-system-new/heapster-7df8cb8c66-zxkk2 | allowed conns: Protocol: TCP 85-90 |
| 19 | src: default/cognetive-agents-js4qc | dest: kube-system-new/calico-node-mgdlr | allowed conns: Protocol: TCP 85-90 |
| 20 | src: default/cognetive-agents-js4qc | dest: kube-system-new/heapster-7df8cb8c66-zxkk2 | allowed conns: Protocol: TCP 85-90 |
| 21 | src: kube-system-new/calico-node-mgdlr | dest: kube-system-new/heapster-7df8cb8c66-zxkk2 | allowed conns: No connections |
| 22 | src: kube-system-new/heapster-7df8cb8c66-zxkk2 | dest: kube-system-new/calico-node-mgdlr | allowed conns: No connections |
| 23 | src: 0.0.0.0-255.255.255.255 | dest: kube-system-new/calico-node-mgdlr | allowed conns: No connections |
| 24 | src: 0.0.0.0-255.255.255.255 | dest: kube-system-new/heapster-7df8cb8c66-zxkk2 | allowed conns: No connections |

FIG. 3A

| src_ns | src_pods/ip_block | dst_ns | dst_pods/ip_block | connection |
|---|---|---|---|---|
| [default] | [*] | [kube-system-new] | [*] | TCP 85-90 |
| | ip block: 0.0.0.0/0 | [default] | [*] | All connections |
| [default,kube-system-new] | [*] | | ip block: 0.0.0.0/0 | All connections |
| [default,kube-system-new] | [*] | [default] | [*] | All connections |

FIG. 3B

| src_ns | src_pods | dst_ns | dst_pods | connection |
|---|---|---|---|---|
| [default] | [has(app) and tier in (analyzer)] | [default] | [has(app) and tier in (agent)] | All connections |

FIG. 3C

INFERRING CLOUD NETWORK CONNECTIVITY AS A MINIMAL LIST OF FIREWALL RULES

BACKGROUND

The present invention relates generally to the field of computing, and more particularly to an open-source container orchestration system such as Kubernetes® (Kubernetes is a registered trademark of The Linux Foundation in the U.S. and/or other countries).

Kubernetes® may be a container orchestration system which enables a user to automate, manage and schedule applications defined by individual containers. A Kubernetes® platform may enable rapid growth by permitting an enterprise to take advantage of cloud providers without restructuring the enterprise's own infrastructure. In many instances, hundreds, or even thousands, of containers may be running as part of a complete application. A pod may be a group of one or more containers, with shared network and/or storage resources, and a specification for how to run the containers. A cluster may provide a means to run the pods in an orchestrated manner (e.g., based on the specification defined by a user).

For example, a container may run in a pod, and a group of pods (e.g., related or unrelated) may run on a cluster. A pod may be a unit of replication on the cluster, and a cluster may contain many pods.

SUMMARY

Embodiments of the present invention disclose a method, computer system, and a computer program product for determining a cluster connectivity. The present invention may first include receiving as input a connectivity graph. The present invention may then include generating a minimal list of firewall rules from the received connectivity graph by iteratively merging firewall rules with commonality of connectivity attribute.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIGS. 3A through 3C are exemplary illustrations of a connectivity graph and a fw-summary according to at least one embodiment;

DETAILED DESCRIPTION

Figure 1:
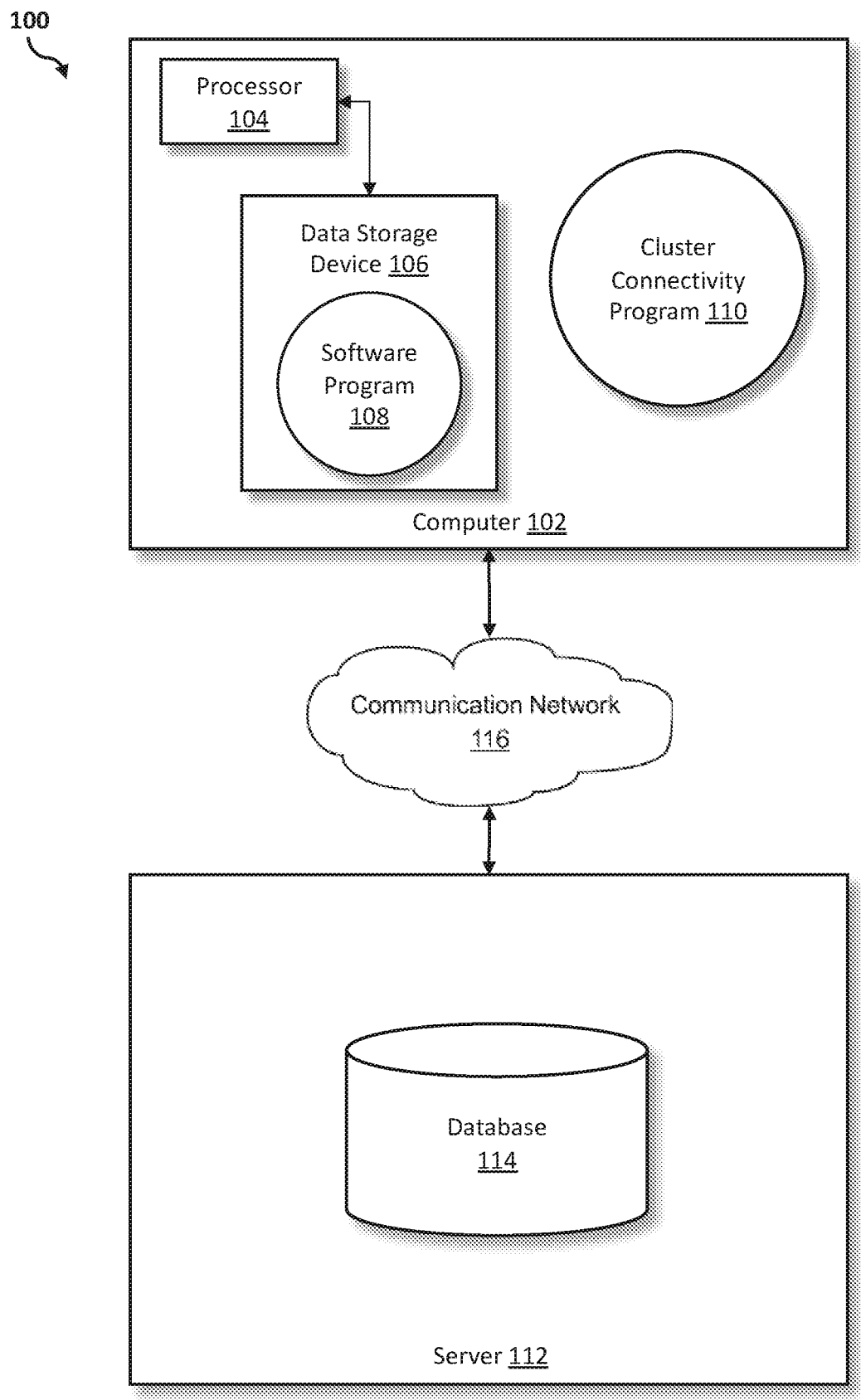
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for determining cluster connectivity. As such, the present embodiment has the capacity to improve the technical field of open-source container orchestration systems by providing a means by which a cluster-wide view of network connectivity may be depicted which may concisely recite all allowed connections in a manner which may be simpler to understand by a human reader. More specifically, the present invention may first include receiving as input a connectivity graph. The present invention may then include generating a minimal list of firewall rules from the received connectivity graph by iteratively merging firewall rules with commonality of connectivity attribute.

As described previously, Kubernetes® may be a container orchestration system which enables a user to automate, manage and schedule applications defined by individual containers. A Kubernetes® platform may enable rapid growth by permitting an enterprise to take advantage of cloud providers without restructuring the enterprise's own infrastructure. In many instances, hundreds, or even thousands, of containers may be running as part of a complete application. A pod may be a group of one or more containers, with shared network and/or storage resources, and a specification for how to run the containers. A cluster may provide a means to run the pods in an orchestrated manner (e.g., based on the specification defined by a user).

For example, a container may run in a pod, and a group of pods (e.g., related or unrelated) may run on a cluster. A pod may be a unit of replication on the cluster, and a cluster may contain many pods.

Kubernetes® may provide network policies for users to specify which network traffic may be allowed and/or denied between pods in the cluster, and between pods and Internet Protocol (IP) addresses outside the cluster. Network policies may be Kubernetes® resources, defined in YAML (a human-readable data-serialization language). Each network policy may define ingress and egress rules for a given set of pods. Whether a given connection is allowed between pods may be decided by a combined behavior of the policies in a cluster.

However, due to the distributive nature of network policies, it may be difficult to enable a cluster-wide view of the allowed connectivity both inside the cluster and outside of the cluster.

Therefore, it may be advantageous to, among other things, provide a textual description of a connectivity graph implied by a set of Kubernetes® network policies, which may be simpler to understand by a human reader. The textual description may be a short list of rules in the format of firewall rules, such that there may be no need to reason about ingress and egress separately since the firewall rules may summarize the connectivity for connections allowed both at ingress policy rules and egress policy rules.

According to at least one embodiment, the present invention may be utilized with any distributive mechanism for defining connectivity. This may include, but is not limited to including, Istio's® authorization policies (Istio is a registered trademark of Google LLC in the U.S. and/or other countries), Amazon VPC's security groups, and/or proprietary network policies defined by other cloud network interfaces.

According to at least one embodiment, the present invention may provide a readable representation of a Kubernetes® cluster connectivity as implied from a set of Kubernetes® network policies defined in YAML. For example, a firewall-rule (fw-rule) may be provided in the following format: <src, dst, allowed connections> where src and dst are each a namespace-label expression, a namespace, a pod-label expression, a pod, or an IP-block. As a matter of procedure, src may send packets to dst over protocols and/or ports specified in the allowed connections. A fw-rule may be generated if and only if the combination of all policy YAML files allows both dst to ingress from src and src to egress to dst.

According to at least one embodiment, the present invention (an fw-rules representation of a cluster connectivity), may be used as an alternative input format for a Kubernetes® network configuration which may be less error-prone to author and more explicit. For this use case, the fw-rules represent connection requirements, and thus may be enhanced with relevant modifiers per rule (e.g. prohibited/ mandatory connections).

According to at least one embodiment, the present invention may be used as an extendable representation which may capture a combined connectivity graph implied by two or more network-configuration platforms, working in several layers. For example, the present invention may be used to capture the combined network connectivity configured by Kubernetes® and another cloud network interface.

According to at least one embodiment, the present invention may be used as a representation to describe semantic differences between two network configurations, including removed connections and added connections. For example, if a topology of two configurations is not the same, then the removed connections fw-rules may be with respect to an old topology, and the added connections fw-rules may be with respect to a new topology.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cluster connectivity program 110. The networked computer environment 100 may also include a server 112 that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cluster connectivity program 110 may interact with a database 114 that may be embedded in various storage devices, such as, but not limited to a computer/mobile device 102, a networked server 112, or a cloud storage service.

According to the present embodiment, a user using a client computer 102 or a server computer 112 may use the cluster connectivity program 110 to concisely summarize a connectivity report as a set of firewall rules, which may allow a user to review the cluster connectivity and verify more easily to confirm that there are no misconfigurations in the policy YAML files. The present invention may be a readable representation of a cluster connectivity as may be implied from a set of, for example, Kubernetes® network policies, as described by the exemplary embodiment herein. The cluster connectivity method is explained in more detail below with respect to FIGS. 2, 3A, 3B, and 3C.

Figure 2:
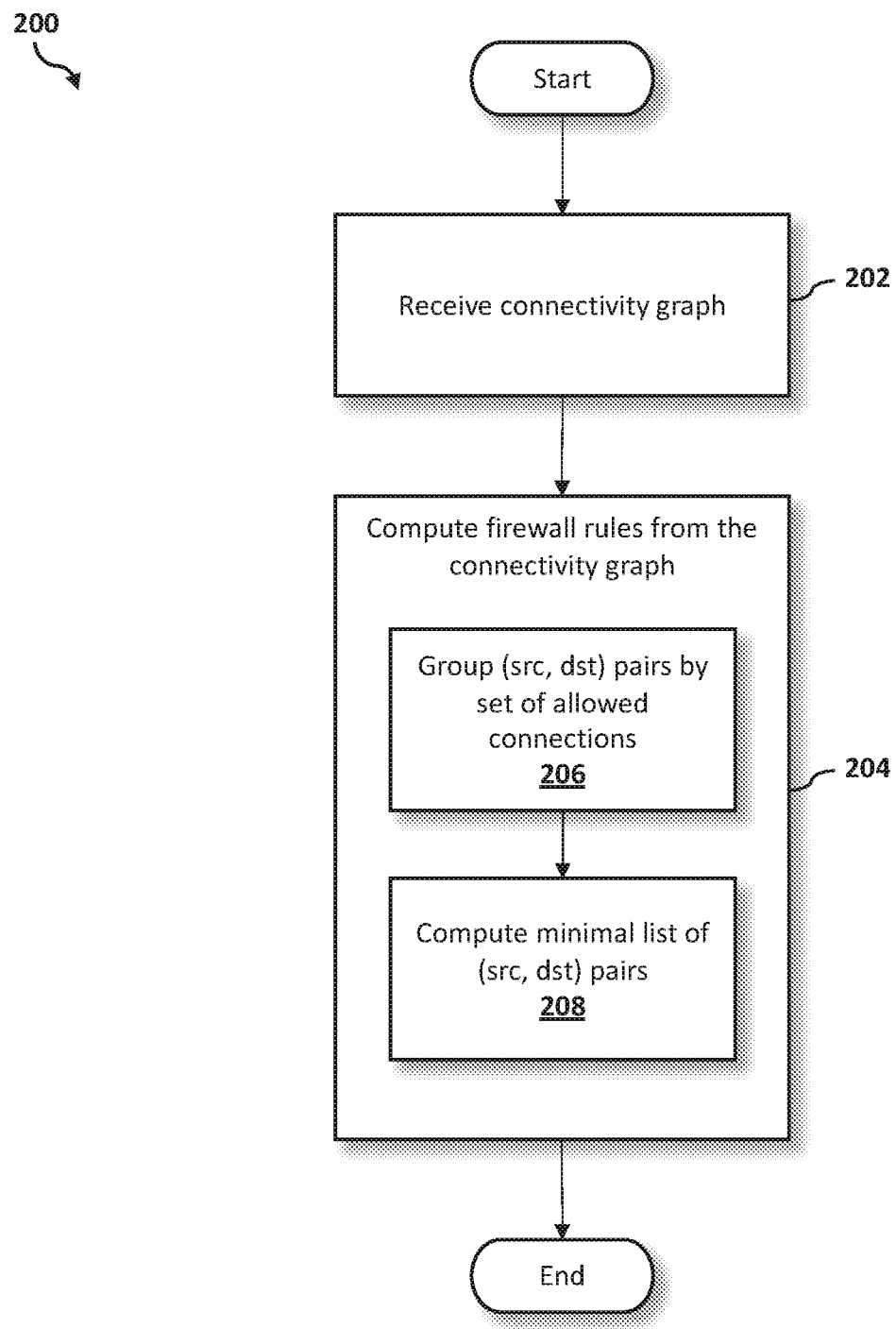
FIG. 2 is an operational flowchart illustrating a process for determining cluster connectivity according to at least one embodiment.

Referring now to FIG. 2, an operational flowchart illustrating the exemplary cluster connectivity process 200 used by the cluster connectivity program 110 according to at least one embodiment is depicted.

At 202, a connectivity graph is received. The connectivity graph may be a list of the cluster's peer pairs (e.g., pods or external IP-blocks) with sets of allowed connections generated from the set of network policies. The connectivity graph may be based on, for example, a cluster topology and set of Kubernetes® network policies. The cluster topology may refer to the pods, namespaces, and labels of pods and namespaces in the cluster. Each pod may be associated with one namespace. The association of pods and namespaces to their sets of labels, keys and values is part of the cluster topology. For example, network policies (i.e., NetworkPolicies) may be a construct within Kubernetes® which allows a user to specify how a pod may communicate with other pods, namespaces, and/or IP blocks. The user may specify what traffic is allowed to travel to and from a selected pod. If no network policies are specified, the pod may, by default, accept traffic from any source. However, once network policies are specified for a pod, that pod may reject any connections not specified by the network policy. Two pods may communicate with each other when both the egress policy (e.g., a policy which allows traffic which matches both the "to" and "ports" section of the network policy) on the source pod and the ingress policy (e.g., a policy which allows traffic which matches both the "from" and "ports"

section of the network policy) on the destination pod accept the traffic. If either pod denies the traffic from the other, then the communication may fail.

Computing the connectivity graph may include computing a set of allowed connections for each pair of peers (e.g., including a pod and another pod or an IP address) in a cluster, including external IP blocks (considering any defaults, ingress rules and/or egress rules). A set of allowed connections may consist of the allowed communication protocols and their allowed features (e.g., destination ports).

Kubernetes® may be an orchestration platform used to run containers and pods. An inside of a Kubernetes® cluster may have pods and an outside may have IP addresses. Network policies may define connectivity aspects of Kubernetes®, including ingress rules and egress rules, as described above. The focus of the present invention may relate to the connections (e.g., which connections are allowed between pods in the same cluster and between pods and outside IP addresses). By default, everything may be allowed (e.g., a pod may be open to receiving everything which, from a security standpoint, may be undesirable). However, the connectivity of a cluster may be modified, and thus, those that want a more secure environment may write policies to restrict connections. Manually determining what may be allowed or denied based on defined network policies may be difficult, especially in a very big network where there may be many network policies.

According to at least one embodiment of the present invention, the firewall rules (i.e., fw-rules), a textual representation of the allowed connectivity that may be inferred from the network policy (e.g., a list of allowed connectivity in the cluster based on what may be defined by the network policies) may be used to determine cluster connectivity. A connectivity graph may be a table representation of connectivity in a cluster, including every connection between pods in the cluster and/or IP-blocks outside of the cluster, among other things. The connectivity graph (e.g., the table depicted by FIG. 3A, which will be described in more detail below) depicting all connectivity existing both within the cluster and outside of the cluster, may be generated. A goal may be to minimize the number of fw-rules by grouping by pod labels, or namespaces (e.g., representing a group of pods which may have the same namespace), among other things. According to at least one embodiment, the present invention may group as many things as possible so that a minimal list of fw-rules results.

At 204, firewall rules (i.e., fw-rules) are computed from the connectivity graph. The fw-rules may not be stored in a Kubernetes® environment but may be given as output in various possible output formats (e.g., txt, YAML, csv, md) and may be inferred from the graph by the computation described herein. For example, a firewall-rule (i.e., fw-rule) may be provided in the following format:

<src, dst, allowed connections> where src and dst are each a namespace-label expression, a namespace, a pod-label expression, a pod, or an IP-block. As a matter of procedure, src may send packets to dst over protocols and/or ports specified in the allowed connections. A fw-rule may be generated if and only if the combination of all policy YAML files allows both dst to ingress from src and src to egress to dst.

Computing firewall rules may be done by first grouping (src, dst) pairs by a set of allowed connections, as described in more detail with respect to step 206, and then computing a minimal list of (src, dst) pairs, as described in more detail with respect to step 208. For example, from the connectivity graph, per each common set of allowed connections, the present invention may group the list of relevant (src, dst) pairs.

The connectivity graph may be an exhaustive table of all possible pairs and their allowed connections. This may be inferred from an inputted YAML file (e.g., which may depict network policies), from which the connectivity graph may be created.

At 206, all pairs (src, dst) are grouped by their set of allowed connections, which may be determined based on the computed connectivity graph. The sets of allowed connections may be imputed from the received connectivity graph, as described previously with respect to step 202 above.

At 208, a minimal list of (src, dst) pairs is finally computed by iteratively merging tuples with common src or dst. Iterative computation may be performed until no further merge operations may be possible. Here, the list of (src, dst) pairs may further be grouped by namespaces for each connection. To group by namespaces, a connection set, peer pairs, and peer pairs from containing connection sets may be utilized. For each pair of namespaces (e.g., namespace ns1 and namespace ns2), the cluster connectivity program 110 may add a fw-rule if their pod-pairs are a subset of the union of peer pairs and peer pairs from containing connection sets. A similar approach may then be applied for grouping only source or destination (e.g., set of pods) into an entire namespace, when possible. For each pair with a pod from the remaining pods, if the elements paired with a pod from the union of peer pairs and peer pairs from containing connection sets cover a namespace (e.g., namespace ns), then the cluster connectivity program 110 may add a fw-rule (e.g., (pod, ns, connection set) or (ns, pod, connection set)) to the list of fw-rules.

A grouping of pods to pod-labels expression may also be performed when possible. To group by pod labels, the list of pods (e.g., per common (src, dst) elements) may be utilized and the pod label expression(s) and/or single pods may be added to the list of fw-rules. For each possible pod label and one of its values, if the list of pods in the cluster for (label, value) is fully covered by the list of pods, then (label, value) may be added as a representation option for the relevant subset of pods. The cluster connectivity program 110 may seek to identify expressions which may cover more pods from an inputted pods list (e.g., as described by the network policies and included in the connectivity graph). However, if some pods are not covered by any expression, then the cluster connectivity program 110 may add the pods as remaining single pods (e.g., not grouped to any pod-label expression, namespace, or ns-label expression).

At each iteration, one dimension (e.g., src or dst,) in alteration, may be chosen to define the required merge operation. This may result in merging single pods into pod-label expressions.

A merge may be done to reduce the connectivity graph into a smaller table by merge operations over tuples in the dimensions: source/destination/allowed connections. When merging source/destination elements, they can be grouped in several levels: pod-labels expressions/namespaces/namespace-label expressions/ip-blocks. (e.g., this may be referred to as performing a fw-computation). The merge operations preserve connectivity semantics, so that after each merge operation, the resulting set of fw-rules is expressing allowed connectivity that is equivalent to the connectivity of the original input table (connectivity graph). For example, in the first step, the connectivity graph tuples may be grouped by sets of allowed connections. For each set of allowed connections which may be identical, based on the connectivity graph, the (src,dst) pairs may be grouped together. For example, for grouping by namespace, the cluster connectivity program 110 may search for sets of pairs that cover an entire cartesian product of namespaces.

It should be stated that this may be only one possible implementation and any other implementation which may group allowed connections and source/destination elements may be used. One other implementation may be reordering the steps in which the allowed connections and source/destination elements may be grouped. Another implementation may be grouping by another data variable or connectivity attributes. Every possible merging technique into fw-rules may also be used.

It should also be stated that, assuming the network policies reside in a version control system, a new table may be generated and added as a comment in the version control system when updates to the network policies are made. Network policies that are either stored in a repository and are not deployed in a Kubernetes® cluster, or network policies that are in a live Kubernetes® cluster, may be analyzed using this system.

The methodology has been described herein with respect to Kubernetes®, but this methodology may be used in other environments (e.g., virtual private clouds which also have connectivity descriptions) to depict a minimal list of connections. The src, dst and allowed connections variable names may be different in other environments, but an indication of allowed connections may be clearly depicted and identifiable by the cluster connectivity program 110. Once variable names are identified in an environment which may differ from the exemplary Kubernetes® environment depicted herein, the cluster connectivity program 110 may perform the identified steps of computing a connectivity graph and thereafter generating a minimal list of firewall rules from the computed connectivity graph.

Referring now to FIGS. 3A through 3C, exemplary illustrations 300 of a connectivity graph and a fw-summary according to at least one embodiment are depicted. FIG. 3A may depict a connectivity graph in the level of single pods. FIG. 3B may depict a fw-summary after a grouping of namespaces and pod labels (if any) is performed. The pods may be grouped into namespaces, so instead of listing all of the pods in the default namespace, it may be stated that one entire namespace may communicate with another entire namespace. For example, in the default namespace, from lines 17 to 20 of FIG. 3A, it may be stated that all of the pods in the default namespace may be permitted to communicate with pods in the kube namespace only over TCP with certain enumerated ports. This fw-summary is depicted by the first line in FIG. 3B.

FIG. 3C may depict a fw-summary after a grouping of pod labels (i.e., pod label expressions) is performed. As is depicted by the table, all the pods in the namespace "default" which have a label "app" and a label "tier" with values "analyzer" are permitted source namespaces. Similarly, all pods in the namespace "default" with a label "app" and a label "tier" with values "agent" are permitted destination namespaces.

It may be appreciated that FIGS. 2, 3A, 3B, and 3C provide only an illustration of one embodiment and do not imply any limitations with regard to how different embodiments may be implemented. Many modifications to the depicted embodiment(s) may be made based on design and implementation requirements.

Figure 4:
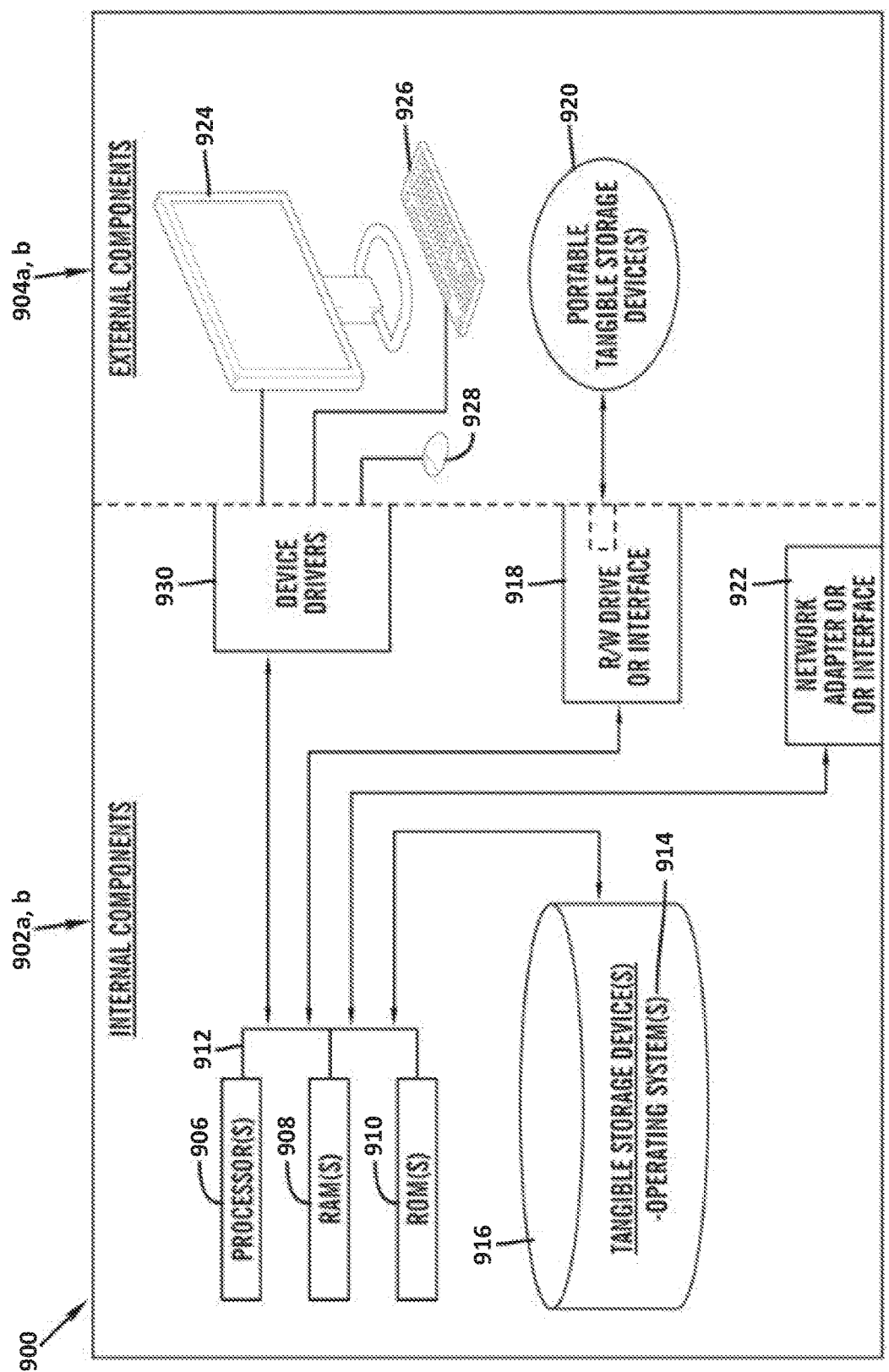
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the cluster connectivity program 110 in client computer 102 may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cluster connectivity program 110 can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the cluster connectivity program 110 in client computer 102 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cluster connectivity program 110 in client computer 102 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
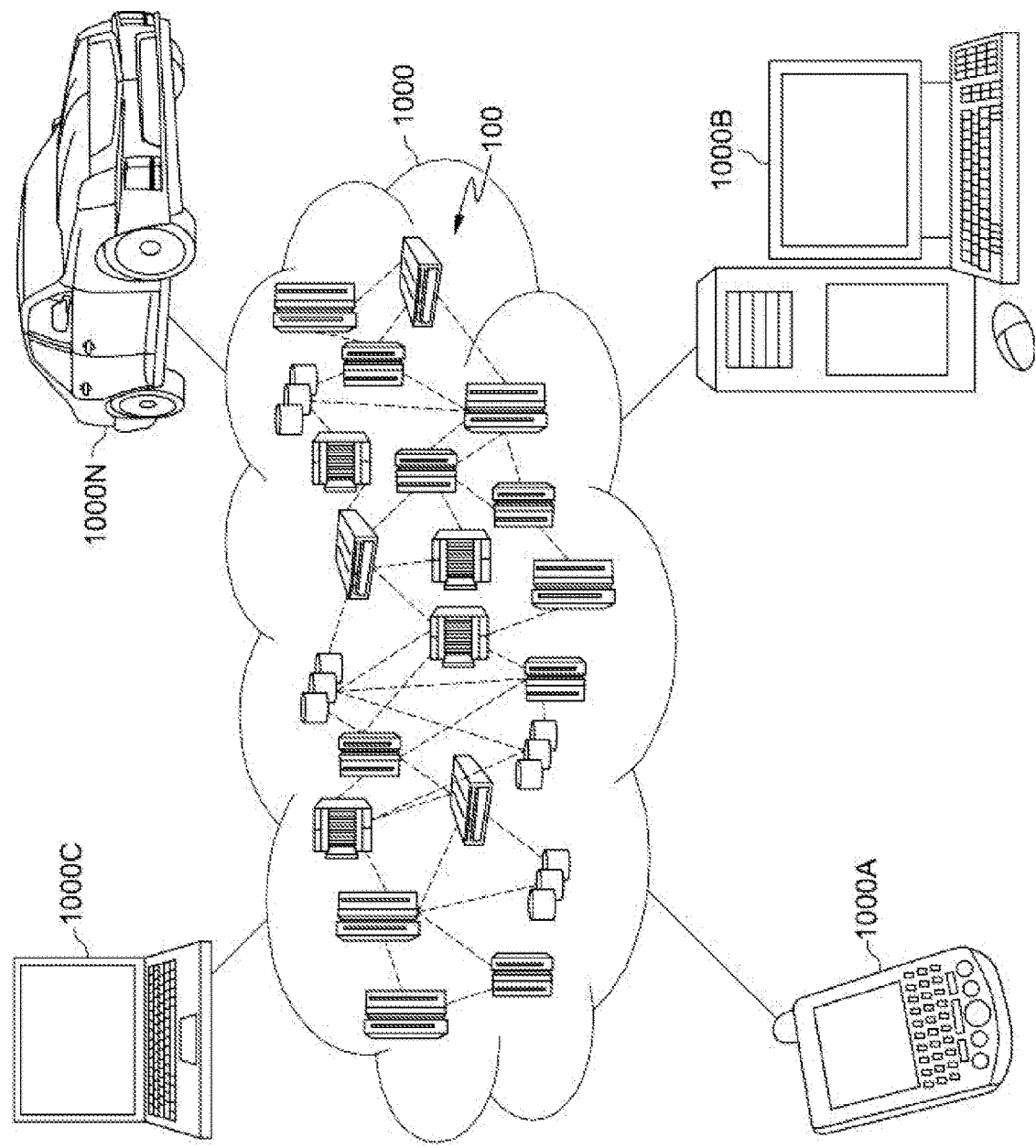
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
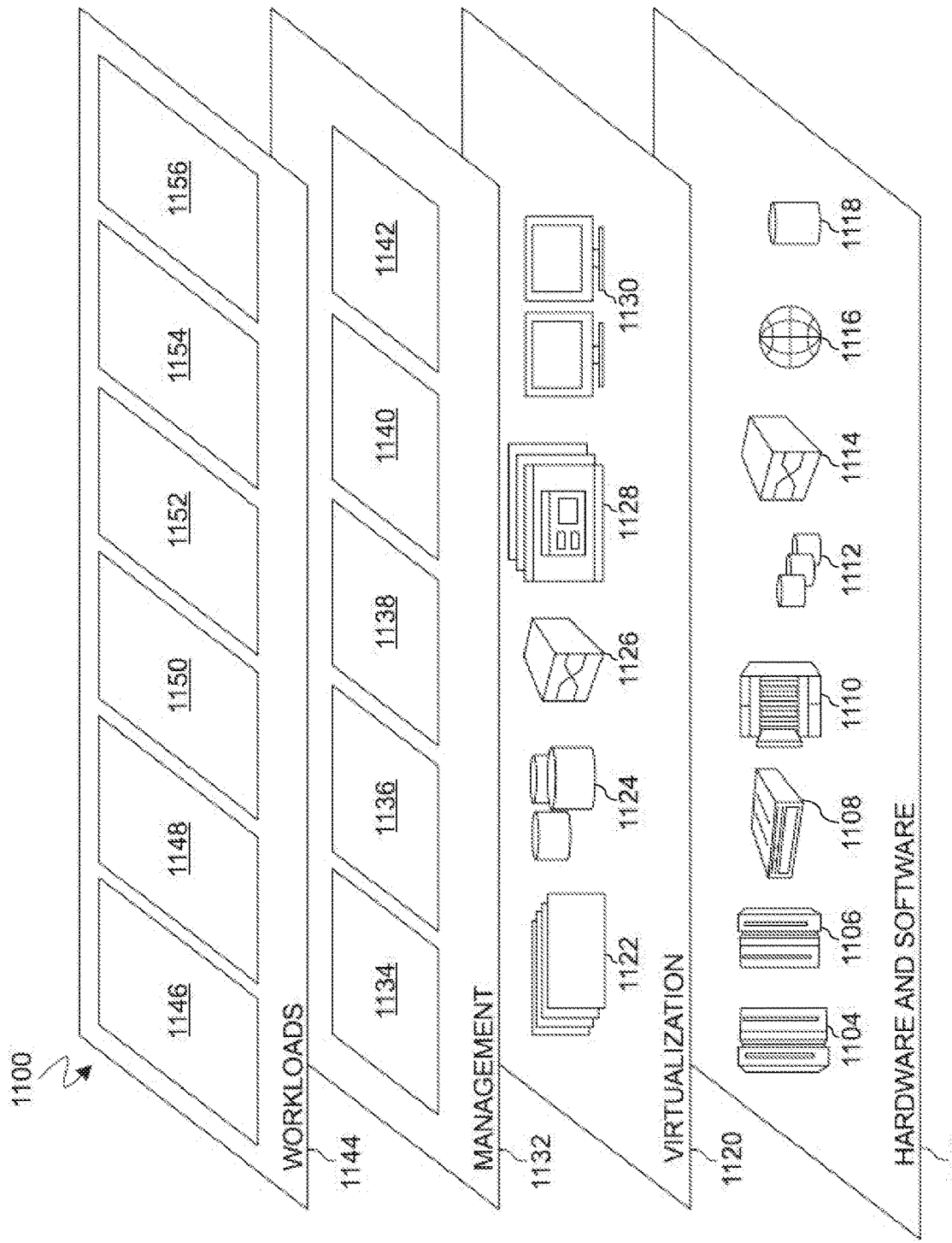
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and cluster connectivity 1156. A cluster connectivity program 110a, 110b provides a way to concisely summarize a connectivity report as a set of firewall rules, which may allow a user to review the cluster connectivity and verify more easily to confirm that there are no misconfigurations in the policy YAML files. The present invention may be a readable representation of a cluster connectivity as may be implied from a set of, for example, Kubernetes® network policies, as described by the exemplary embodiment herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving as input a connectivity graph that includes a list of peer pairs with a plurality of connection sets generated from a plurality of sets of network policies;
grouping, from the connectivity graph, a first set of peer pairs from the list of peer pairs with a connection set by a pod label expression, wherein a namespace associated with the pod label expression includes the first set of peer pairs and a second set of peer pairs from the list of peer pairs; and
generating a minimal list of firewall rules from the connectivity graph by iteratively merging a set of firewall rules with commonality of connectivity attributes, wherein the minimal list of firewall rules include the grouping of the first set of peer pairs with the connection set by the pod label expression.

2. The method of claim 1, wherein a firewall rule of the set of firewall rules is generated when a combination of the plurality of sets of network policies define ingress and egress rules for the first set of peer pairs from the list of peer pairs.

3. The method of claim 1, wherein the connectivity graph is a table representation of a cluster's peer pairs with sets of allowed connections.

4. The method of claim 1, wherein a list of firewall rules is used as an input for a Kubernetes network configuration.

5. A computer system comprising:
one or more computer-readable storage media; and
program instructions stored on the one or more computer-readable storage media to perform operation comprising:
receiving as input a connectivity graph that includes a list of peer pairs with a plurality of connection sets generated from a plurality of sets of network policies;
grouping, from the connectivity graph, a first set of peer pairs from the list of peer pairs with a connection set by a pod label expression, wherein a namespace associated with the pod label expression includes the first set of peer pairs and a second set of peer pairs from the list of peer pairs; and
generating a minimal list of firewall rules from the connectivity graph by iteratively merging a set of firewall rules with commonality of connectivity attributes, wherein the minimal list of firewall rules include the grouping of the first set of peer pairs with the connection set by the pod label expression.

6. The computer system of claim 5, wherein a firewall rule of the set of firewall rules is generated when a combination of the plurality of sets of network policies define ingress and egress rules for the first set of peer pairs from the list of peer pairs.

7. The computer system of claim 5, wherein the connectivity graph is a table representation of a cluster's peer pairs with sets of allowed connections.

8. The computer system of claim 5, wherein a list of firewall rules is used as an input for a Kubernetes network configuration.

9. A computer program product comprising:
a processor set;
one or more computer-readable storage media; and program instructions stored on the one or more computer-readable storage media to cause the processor set to perform operations comprising:
- receiving as input a connectivity graph that includes a list of peer pairs with a plurality of connection sets generated from a plurality of sets of network policies;
- grouping, from the connectivity graph, a first set of peer pairs from the list of peer pairs with a connection set by a pod label expression, wherein a namespace associated with the pod label expression includes the first set of peer pairs and a second set of peer pairs from the list of peer pairs; and
- generating a minimal list of firewall rules from the connectivity graph by iteratively merging a set of firewall rules with commonality of connectivity attributes, wherein the minimal list of firewall rules include the grouping of the first set of peer pairs with the connection set by the pod label expression.

10. The computer program product of claim 9, wherein a firewall rule of the set of firewall rules is generated when a combination of the plurality of sets of network policies define ingress and egress rules for the first set of peer pairs from the list of peer pairs.

11. The computer program product of claim 9, wherein the connectivity graph is a table representation of a cluster's peer pairs with sets of allowed connections.

12. The computer program product of claim 9, wherein a list of firewall rules is used as an input for a Kubernetes network configuration.

* * * * *